(12) United States Patent
Efland

(10) Patent No.: US 11,740,100 B2
(45) Date of Patent: Aug. 29, 2023

(54) SYSTEMS AND METHODS FOR PROVIDING VIRTUAL NAVIGATION GUIDANCE

(71) Applicant: Lyft, Inc., San Francisco, CA (US)

(72) Inventor: Kris Richard Efland, Lafayette, CA (US)

(73) Assignee: Lyft, Inc., San Francisco, CA (US)

( * ) Notice: Subject to any disclaimer, the term of this patent is extended or adjusted under 35 U.S.C. 154(b) by 56 days.

(21) Appl. No.: 17/411,949

(22) Filed: Aug. 25, 2021

(65) Prior Publication Data

US 2022/0011133 A1    Jan. 13, 2022

Related U.S. Application Data

(63) Continuation of application No. 16/366,869, filed on Mar. 27, 2019, now Pat. No. 11,137,263.

(51) Int. Cl.
*G01C 21/20* (2006.01)
*G01C 21/36* (2006.01)
*G06V 20/20* (2022.01)
*G01C 21/34* (2006.01)

(52) U.S. Cl.
CPC ......... *G01C 21/3626* (2013.01); *G01C 21/20* (2013.01); *G06V 20/20* (2022.01); *G01C 21/3423* (2013.01)

(58) Field of Classification Search
CPC ................ G01C 21/3626; G01C 21/20; G01C 21/3423; G06V 20/20
See application file for complete search history.

(56) References Cited

U.S. PATENT DOCUMENTS

| | | | |
|---|---|---|---|
| 5,559,707 A * | 9/1996 | DeLorme | G01C 21/3688 701/426 |
| 10,295,353 B2 | 5/2019 | Konig et al. | |
| 2003/0109266 A1 | 6/2003 | Rafiah et al. | |
| 2008/0319655 A1 | 12/2008 | Vande Velde | |
| 2010/0228574 A1 | 9/2010 | Mundinger et al. | |
| 2011/0112750 A1 | 5/2011 | Lukassen | |
| 2011/0177845 A1 | 7/2011 | Fasold | |
| 2013/0046456 A1* | 2/2013 | Scofield | G08G 1/096838 701/117 |
| 2014/0278616 A1 | 9/2014 | Stone et al. | |
| 2016/0187148 A1 | 6/2016 | Unger et al. | |
| 2018/0005434 A1 | 1/2018 | Ren et al. | |
| 2020/0167702 A1* | 5/2020 | Beaurepaire | G01C 21/3438 |

FOREIGN PATENT DOCUMENTS

EP    3118580 A1    1/2017
EP    3376164 A1 *  9/2018    ........... G01C 21/343

* cited by examiner

*Primary Examiner* — Calvin Cheung
(74) *Attorney, Agent, or Firm* — Sheppard Mullin Richter & Hampton LLP

(57) ABSTRACT

Systems, methods, and non-transitory computer-readable media can receive a starting location and a destination location. A route from the starting location to the destination location is determined. A video preview of the route is generated based on map data associated with the route. The video preview depicts one or more vehicles to be taken by a user traversing the route.

20 Claims, 11 Drawing Sheets

SYSTEMS AND METHODS FOR PROVIDING VIRTUAL NAVIGATION GUIDANCE

This application is a continuation of U.S. patent application Ser. No. 16/366,869, now U.S. Pat. No. 11,137,263, filed on Mar. 27, 2019 and entitled "SYSTEMS AND METHODS FOR PROVIDING VIRTUAL NAVIGATION GUIDANCE", which is incorporated in its entirety herein by reference.

FIELD OF THE INVENTION

The present technology relates to the field of electronic navigation systems. More particularly, the present technology relates to systems, apparatus, and methods for providing electronic navigation guidance to a user.

BACKGROUND

Computing devices, such as mobile devices, are increasingly being equipped with navigation systems capable of providing navigation guidance to users. In general, a user can use a computing device to enter a starting location and a destination location in order to receive instructions about how to travel from the starting location to the destination location. For example, a user can enter a starting location and a destination location, and a navigation system can provide the user with instructions about how to travel by car from the starting location to the destination location.

SUMMARY

Various embodiments of the present technology can receive a starting location and a destination location. A route from the starting location to the destination location is determined. A video preview of the route is generated based on map data associated with the route. The video preview depicts one or more vehicles to be taken by a user traversing the route.

In an embodiment, the generating the video preview comprises: identifying a plurality of points along the route, wherein each point of the plurality of points is associated with a geographic location; identifying, for each point of the plurality of points, map data pertaining to one or more views from the geographic location associated with the point; and stitching together at least some of the map data to generate the video preview.

In an embodiment, the map data comprises, for each point of at least some of the plurality of points, an image captured from the geographic location associated with the point.

In an embodiment, the map data comprises, for each point of at least some of the plurality of points, three-dimensional point cloud data captured from the geographic location associated with the point.

In an embodiment, video preview presents a simulation of the route from a first-person perspective of a user traversing the route.

In an embodiment, an augment reality interface is generated in which one or more augmented reality navigation guidance indicators are overlaid on objects detected in an environment of the user to direct the user along the route. The one or more augmented reality navigation guidance indicators comprise a first augmented reality navigation guidance indicator identifying a specific vehicle to be taken by the user.

In an embodiment, the augmented reality interface comprises image data being captured by a camera on a mobile device associated with the user and at least some of the one or more augmented reality navigation guidance indicators are overlaid on the image data.

In an embodiment, the first augmented reality navigation guidance indicator is overlaid on the image data and identifies the specific vehicle within the image data.

In an embodiment, a user can toggle between presentation of the augmented reality interface and the video preview based on an action taken by the user.

In an embodiment, the action taken by the user comprises movement of a mobile device from a first orientation to a second orientation.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
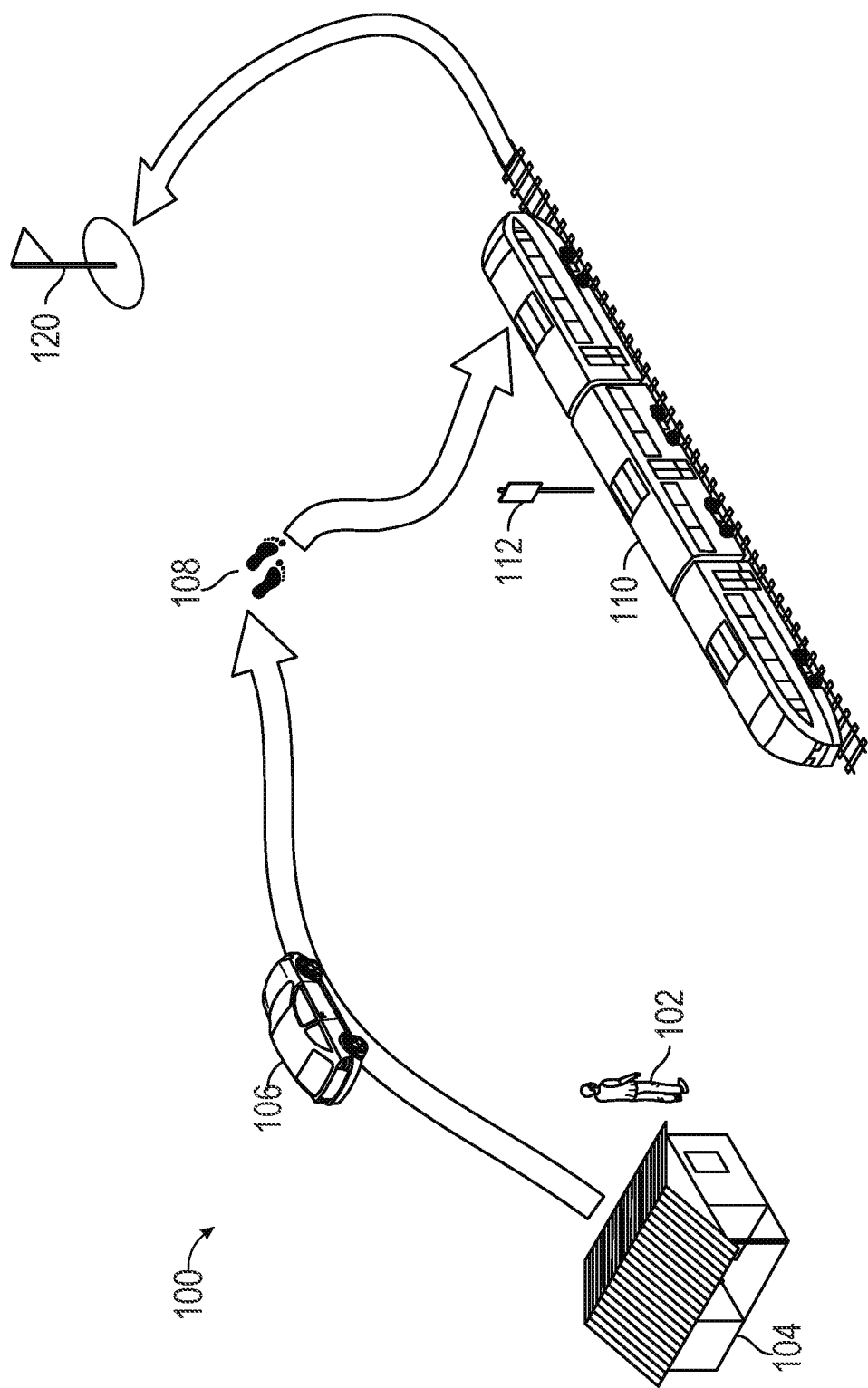
FIG. 1 illustrates an example scenario illustrative of challenges that may be experienced using conventional approaches.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Computing devices, such as mobile devices, are increasingly being equipped with navigation systems capable of providing navigation guidance to users. In general, a user can use a computing device to enter a starting location and a destination location in order to receive instructions about how to travel from the starting location to the destination location. For example, a user can enter a starting location and a destination location, and a navigation system can provide the user with instructions about how to travel by car from the starting location to the destination location.

In certain instances, traveling from one location to another may require a multi-modal trip or route involving use of more than one mode of transport. Such multi-modal trips can often cause anxiety to travelers, leading to lower request rates and slower adoption of various modes of transportation. Take for example a traveler who is about to visit another city. The traveler may need to take a rideshare service vehicle to get to a train station, ride a train from the train station to an airport, then fly from the airport to another airport in another city. If the traveler is not familiar with the layout of the train station and/or the airport, or any other aspect of the multi-modal trip, the experience can be daunting. If a mistake is made, such as the traveler going to the wrong platform in the train station and mistakenly entering the wrong train, timely progress of traveler could be significantly impeded with unfortunate consequences. Missing a train could mean missing a plane, and missing the plane can ruin an entire trip. The anxiety can lead to a lower adoption of such multi-leg/multi-modal trips. While conventional navigation systems may provide users with general instructions for how to navigate from one location to another, conventional navigation systems fail to provide sufficiently specific information to allow users to reliably and precisely transition from one mode of transportation to another. Furthermore, new modes of transport are increasingly becoming available. For example, electric scooters have become popular as a mode of transportation. However, conventional navigation systems may lack capabilities that can accommodate or encourage utilization of newly introduced modes of transportation. This can lead to lower adoption and decreased efficiency of both navigation systems and transportation networks as a whole. Conventional approaches fail to address these problems, among others.

FIG. 1 illustrates an example multi-leg/multi-modal trip that is illustrative of various challenges that may be experienced using conventional navigation systems. FIG. 1 illustrates one example scenario 100 (not drawn to scale) in which a traveler 102 is about to make a trip. The traveler 102 is traveling from a starting location 104 to a destination location 120. Under conventional approaches, the traveler 102 may enter the starting location 104 and the destination location 120 into a navigation system and receive instructions about how to travel from the starting location 104 to the destination location 120. In the example scenario 100, the navigation system instructs the user to take a ridesharing service 106 from the starting location 104 to a first location 108, travel by foot from the first location 108 to a train stop 112, and then take a train 110 from the train stop 112 to the destination location 120. However, conventional navigation systems may fail to adequately instruct the user on the precise route to take by foot from the first location 108 to the train stop 112 or, once the user arrives at the train stop 112, how to board the train 110 or, once the user is on the train 110, when the user should exit the train 110 in order to arrive at the destination location 120. At each of these junctures, there is the potential for a user to lose their way. In this way, conventional navigation systems may fail to provide a user with sufficient information to ensure that they efficiently and reliably arrive at their ultimate destination.

Figure 2A:
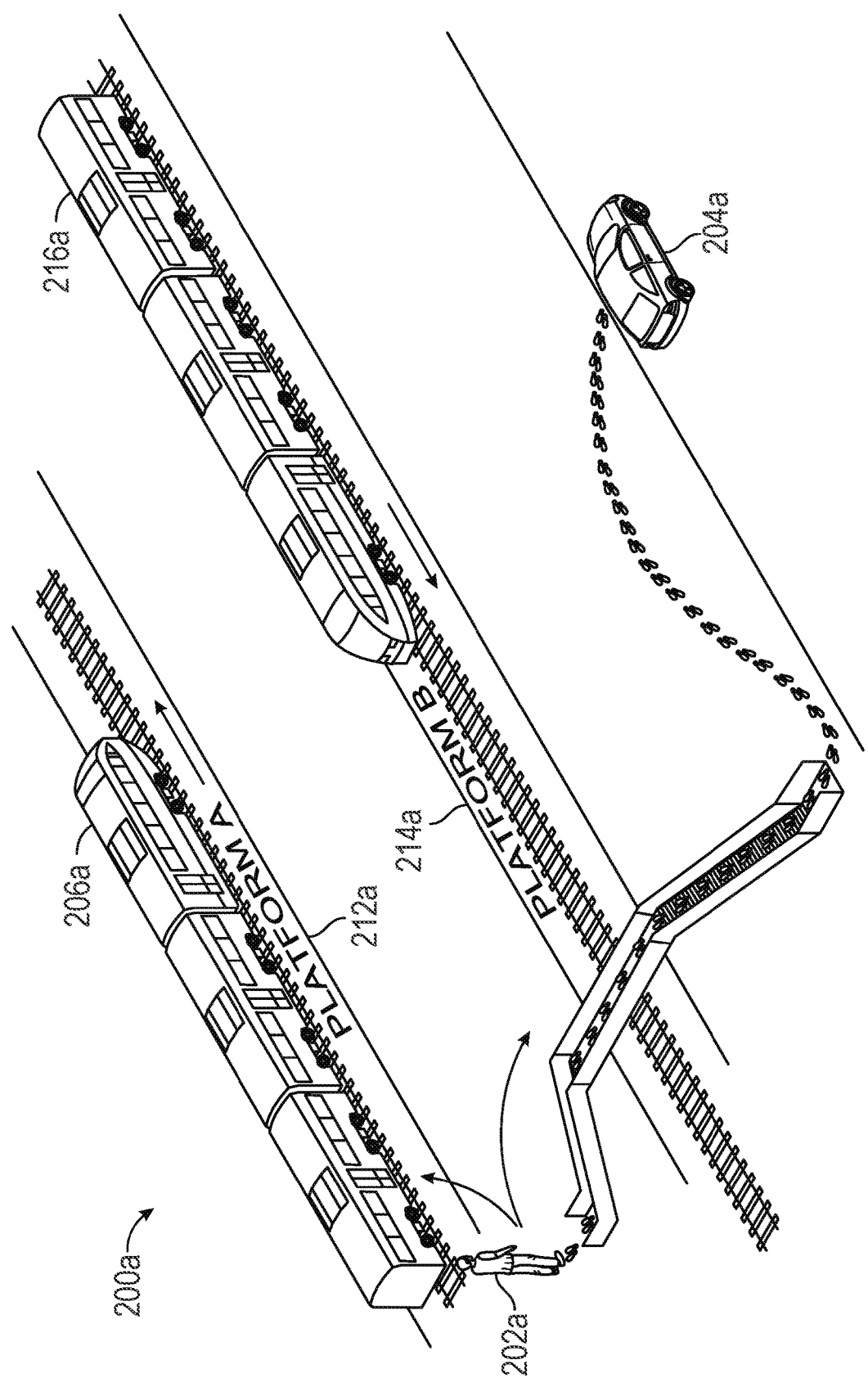
FIGS. 2A-2B illustrate various scenarios illustrative of challenges that may be experienced using conventional approaches.
Figure 2B:
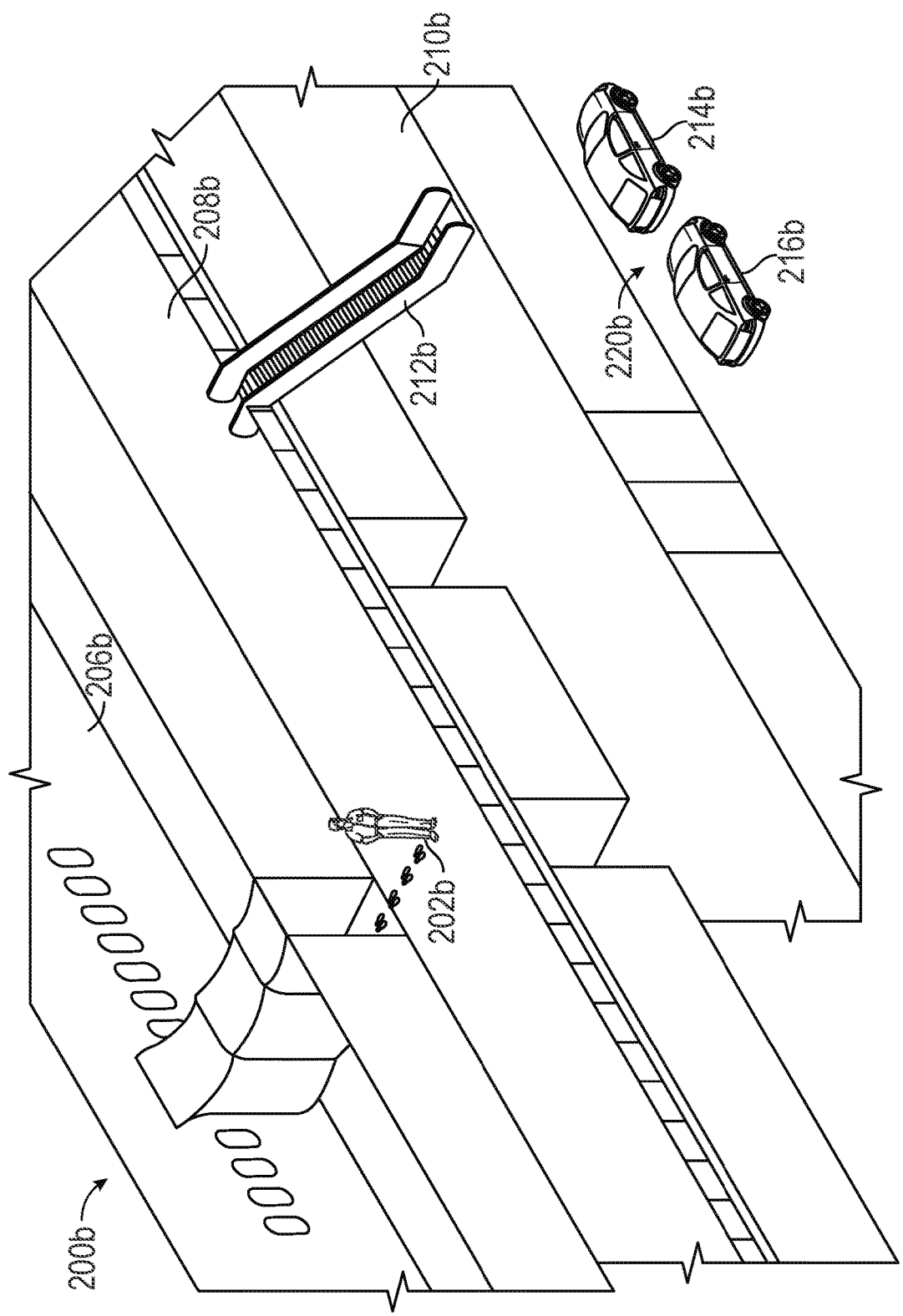

FIGS. 2A-2B illustrate additional example scenarios that further illustrate various challenges that may be experienced by a traveler using conventional approaches. FIG. 2A illustrates an example scenario 200a, in which a traveler 202a has just completed a leg of a trip associated with a rideshare service 204a. Due to a traffic jam, the traveler 202a arrived at a train station only moments before scheduled departure of their train. When confronted with two trains 206a, 216a, on two different platforms 212a, 214a, respectively, the traveler 202a is uncertain which of the trains 206a, 216a is the correct train for the next leg of the trip. Furthermore, consider an example scenario in which the traveler 202a is visiting a foreign country and is unfamiliar with and/or unable to read signs in the train station. The traveler 202a does not have ready means to identify which train to get on before it departs. In these scenarios, conventional navigation systems may not provide sufficiently granular or helpful information to allow the traveler to identify, reach, and board the correct train.

FIG. 2B illustrates another example scenario 200b illustrative of challenges that may be experienced by a traveler 202b with conventional technology. Here, the traveler 202b has just gotten off a plane 206b and must now take a rideshare service to his or her next destination. Due to complexity of the airport (and/or a city ordinance that requires rideshare service vehicles to wait at certain remote locations), the traveler 202b may not find it easy to get to a rideshare service pickup area 220b. In this example scenario, the traveler 202b is located at an upper floor 208b of the airport. To get to the rideshare service pickup area 220b, the traveler 202b needs to use an escalator 212b to get to a lower floor 210b and must exit the airport through the proper exit. If the airport does not provide adequate directional guidance, the traveler 202b can waste time figuring out where to go. Additionally, even when the traveler 202b successfully gets to the rideshare service pickup area 220b, the traveler 202b could find the area busy with numerous vehicles all waiting to pick up passengers (e.g., rideshare service vehicles 214b, 216b). In this scenario, conventional technology may offer little, if any, assistance in identifying the correct rideshare service vehicle for the traveler 202b.

An improved approach in accordance with the present technology overcomes the foregoing and other disadvantages associated with conventional approaches. In general, the present technology can assist a traveler traveling from a starting location to a destination location and transitioning between various modes of transport by providing navigation guidance that includes tailored transition assistance. In certain embodiments, the navigation guidance can include a "preview" of the route to be taken by the traveler. In various embodiments, the preview can show the entire trip or one or more portions (e.g., legs) of the trip. In certain embodiments, navigation guidance can include real-time navigation guidance, and can be tied to the traveler's immediate environment. For example, a traveler holding a mobile computing device and pointing a camera on the mobile computing device at a group of rideshare service vehicles can be provided with a visual navigation guidance indicator pointing out which of the vehicles the traveler should enter for the next leg of the trip.

In various embodiments, navigation guidance can include cues (e.g., visual, auditory, tactile, etc.) that direct the traveler along a route and/or toward a next mode of transport. In certain embodiments, the cues can be presented to the traveler in an immersive form, such as in an augmented reality interface, a virtual reality interface, or the like. In certain embodiments, cues can be provided through a display mounted on a vehicle carrying the traveler, such as via a display mounted in or on a ridesharing service vehicle or other type of vehicle. In certain embodiments, cues can be provided on a computing device associated with the traveler, such as on a display of a mobile device. In various embodiments, navigation guidance can be provided to multiple displays based on various factors including, for example, presence of the traveler in a mode of transport, proximity of a user to certain displays, and the like. For example, display of navigation guidance for a traveler within a rideshare service vehicle may activate when a traveler enters the vehicle and deactivate when the traveler exits the vehicle. In various embodiments, navigation guidance can be provided via a display according to the display's form factor. For example, a rideshare service vehicle may have Head-Up Displays (HUD) projecting on front, side, rear, or ceiling (e.g., roof) windows which may each adjust presentation of navigation guidance according to their location, orientation, and ambient brightness.

In an embodiment, a traveler can be presented with navigation guidance in various presentation formats in order to view navigation guidance in different ways. For example, in one presentation format, the traveler may be presented with a video preview visually demonstrating the route to be traveled by the traveler, whereas in another presentation format, the traveler may be presented with real-time navigation guidance via an augmented reality (AR) overlay displayed through a camera interface (e.g., viewfinder) which provides cues and/or indicators that supplement the surrounding environment of the traveler. In various embodiments, the real-time navigation guidance can be presented as pure AR or mixed mode AR, and the real-time navigation guidance can be presented on opaque, semi-transparent, or transparent displays. In certain instances, different presentation formats may be presented on different displays (e.g., simultaneously or non-simultaneously), while in other instances, a user may be able to toggle a single display between multiple presentation formats. More details relating to the present technology are provided below.

Figure 3:
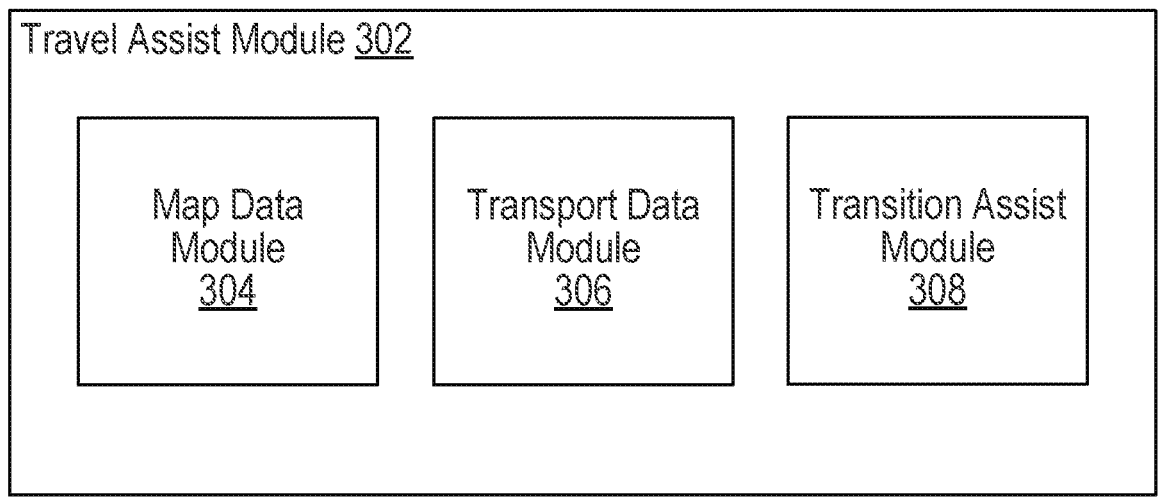
FIG. 3 illustrates an example travel assist module, according to an embodiment of the present technology.
Figure 3:
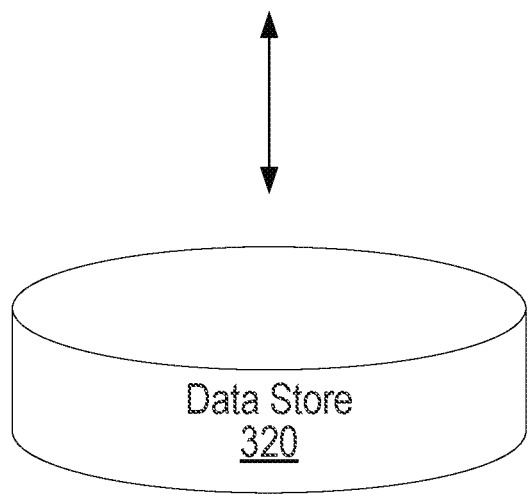

FIG. 3 illustrates an example system 300 including an example travel assist module 302, according to an embodiment of the present technology. As shown in the example of FIG. 3, the travel assist module 302 can include a map data module 304, a transport data module 306, and a transition assist module 308. In some embodiments, some or all of the functionality performed by the travel assist module 302 and its sub-modules may be performed by one or more backend computing systems, such as the transportation management system 760 of FIG. 7. In some embodiments, some or all of the functionality performed by the travel assist module 302 and its sub-modules may be performed by one or more computing systems implemented in a vehicle, such as the vehicle 740 of FIG. 7. In some embodiments, some or all of the functionality performed by the travel assist module 302 and its sub-modules may be performed by one or more computing systems implemented in a computing device, such as the computing device 730 of FIG. 7. In some instances, the example system 300 can include at least one data store 320. In some embodiments, some or all data stored in the data store 320 can be stored by a transportation management system 760 of FIG. 7. In some embodiments, some or all data stored in the data store 320 can be stored by the vehicle 740 of FIG. 7 and/or the computing device 730 of FIG. 7. The components (e.g., modules, elements, etc.) shown in this figure and all figures herein are exemplary only, and other implementations may include additional, fewer, integrated, or different components. Some components may not be shown so as not to obscure relevant details.

The travel assist module 302 can be configured to communicate and operate with the at least one data store 320, as shown in the example system 300. The at least one data store 320 can be configured to store and maintain various types of data. For example, the data store 320 can store various map data for use by the map data module 304. The data store 320 can store information describing roads, physical structures located on roads and their related features, indoor map data pertaining to features contained within physical structures, data identifying points of interest, to name some examples. The various map data can include semantic maps, high-definition (HD) maps, indoor maps, venue maps (e.g., layouts of establishments, such as buildings, theaters, stations, malls, etc.), ingress and egress maps (e.g., doors, elevators, gates, emergency exits, etc.), pick-up/drop-off locations, points of interest (e.g., bathrooms, escalators, security checkpoints, etc.), and the like. The stored maps can be 2-dimensional or 3-dimensional. Furthermore, the stored maps can contain absolute locational information (such as latitude or longitude) or relative locational information (such as "a statue located at the center of a circular fountain"). Accordingly, the stored maps can include some environmental and positional information of various structures and objects.

The map data module 304 can be configured to access map data (e.g., from the data store 320). Some of the types of map data the map data module 304 can access include semantic maps, HD maps, indoor maps, venue maps, ingress/egress maps, building footprints, or the like. Map data can include map data pertaining to outdoor environments (e.g., geographic maps, road maps, etc.) as well as indoor environments (e.g., venue/structure maps, ingress/egress maps, etc.). The map data may be configured such that data from various maps can be combined and/or layered on top of one another. For example, a geographical 2-dimensional map may provide a base layer on which, for example, virtual buildings can be positioned using structural map data. As another example, the structural map data can further act as a base layer on which, for example, indoor map data, venue map data, and/or ingress/egress map data can be layered to populate virtual buildings with virtual doors and points of interest.

The map data module 304 may generate 2-dimensional and/or 3-dimensional environments based on map data. In some instances, using techniques utilizing color, voxels, point clouds, 3-dimensional landmark meshes, or various texture generation techniques, the map data module 304 may generate a realistic environment. As will be discussed further with respect to the transition assist module 308, the generated 2-dimensional or 3-dimensional environments can be used to provide navigation guidance to a traveler.

The transport data module 306 can be configured to access and supply transport data pertaining to various modes of transport. Transport data may include vehicle schedule data, dynamic transport data, and/or other transport related data. Vehicle schedule data may include information such as rideshare schedule information, train schedule information, bus schedule information, airplane schedule information, and the like. For example, train schedule information can include departure location, departure time, destination location, arrival time, boarding platforms, etc. Dynamic transport data can include data that is updated periodically and/or in real-time. For example, dynamic transport data can include information pertaining to actual and forecasted delays, early arrivals, vehicle operation status, etc. In various embodiments, municipalities, cities, air traffic controllers, and/or other entities may make live position data available for specific trains, buses, planes, or other transportation vessels/vehicles. As such, in various embodiments, dynamic transport data can include live position data for one or more vehicles. In some embodiments, dynamic transport data may include traffic information and rideshare service information (e.g., service rate information). Other dynamic transport data can include information pertaining to, for example, availability of vehicles (e.g., direction, speed, share pool status, etc.) or a number and/or location of vehicles (e.g., number of vehicles servicing an area, status of a bicycle or electric scooter rack, etc.). In some instances, dynamic transport data may identify the exact location of a vehicle associated with and/or assigned to a traveler. Other transport related data may include any transport-related information that may be useful for providing navigation guidance to a traveler.

The transition assist module 308 can be configured to generate and provide navigation guidance. Generating navigation guidance can include generating route information defining a route to direct a user from a starting location to a destination location. In some embodiments, the transition assist module 308 can generate and provide multiple routes from which a user can select one route. In some embodiments, a user may provide criteria and/or user preferences for generating routes and/or route information. User preferences may include a user preference for a route (or routes) that has the fewest number of transitions between different modes of transport, a user preference for a route that has the lowest travel fare, a user preference for a route (or routes) that has the lowest travel duration, etc. In certain embodiments, the transition assist module 308 may customize various aspects of its navigation guidance based on access limitations of the user. For example, the transition assist module 308 may generate limited access guidance for people with access limitations. The limited access guidance can, for example, direct a user to an elevator instead of stairs or wheelchair ramps instead of escalator depending on user needs. Route information can be generated, for example, based on map data (from the map data module 304) and transport data (from the transport data module 306). In certain embodiments, route information can be overlaid and/or transposed on 2-dimensional or 3-dimensional environments generated by the map data module 304 and/or using map data provided by the map data module 304.

In certain embodiments, navigation guidance can include visual, auditory, and/or tactile cues to direct a traveler along a route. Visual cues can take any appropriate form including, but not limited to, arrows, text (e.g., "turn right," "scooter rack behind the building," etc.), and/or symbols (e.g., goal line, goal post, flag, etc.). Some of the visual cues can be related to time. For example, numbers may be used to identify a transport schedule or remaining time before departure. In some embodiments, other visual properties such as color can be used to relay navigation guidance. For example, a green colored graphic (e.g., goal post) could indicate that the traveler has ample time to get to a next waypoint, whereas a red colored graphic could indicate that the next transport is leaving imminently (e.g., less than a threshold amount of time remains until departure). In some instances, the traveler may interact with the navigation guidance to access additional information. For example, the traveler may "zoom in" to see route information for a particular portion or leg of a trip, or "zoom out" to see route information for the entire trip. Auditory and tactile cues can include guidance provided to the traveler in the form of, respectively, audio signals and physical prompts (e.g., vibrations) delivered from a computing device to appropriately direct the traveler along an intended route. In various embodiments, the transition assist module 308 may alter the visual, auditory, or tactile cues based on user disabilities or attributes. For example, for a user with impaired vision, the navigation guidance may exclude or limit visual cues, and may provide additional auditory and/or tactile cues. For example, navigation guidance for a visually impaired user may provide auditory and/or tactile cues instructing the user of the appropriate time to enter or exit an elevator. In another example, for a user with impaired hearing who may miss an auditory announcement of an impending train departure, the navigation guidance may inform the user of the impending departure with tactile or visual cues In certain embodiments, a user may be able to toggle between various presentation formats to view navigation guidance in different ways. For example, in a first presentation format, a user may be presented with navigation guidance in the form of a route preview that previews the route to be traveled by the user (e.g., a video walking the user through the route, or a map view illustrating the route on a two-dimensional map) and, in a second presentation format, a user may be presented with navigation guidance in the form of an augmented reality overlay which overlays navigation guidance on top of objects in the user's surrounding environment (e.g., an augmented reality overlay laid on top of image data that depicts the user's surroundings). In certain embodiments, a user may be presented with different presentation formats on different displays. For example, an in-vehicle display may present a route preview, while a user's mobile device may display real-time navigation guidance through an augmented reality interface. In certain embodiments, a user may toggle between different presentation formats on a single display by taking a particular action. For example, a user can position his or her mobile device in a first orientation for a first presentation format, and may position his or her mobile device in a second orientation for a second presentation format. For example, if a user orients his or her mobile device in a horizontal orientation substantially parallel to the ground (e.g., such that the plane of the mobile device creates an angle of between 0 to 45 degrees with the ground), the user can be presented with a video preview of his or her route, and if the user orients his or her mobile device in a vertical orientation substantially perpendicular to the ground (e.g., such that the plane of the mobile device creates an angle of between 45 to 90 degrees with the ground), the user can be presented with a camera interface reflecting an AR overlay that provides real-time navigation guidance indicators applied to objects in the user's environment as depicted in the camera interface. More details regarding the transition assist module 308 will be provided below with reference to FIG. 4.

Figure 4:
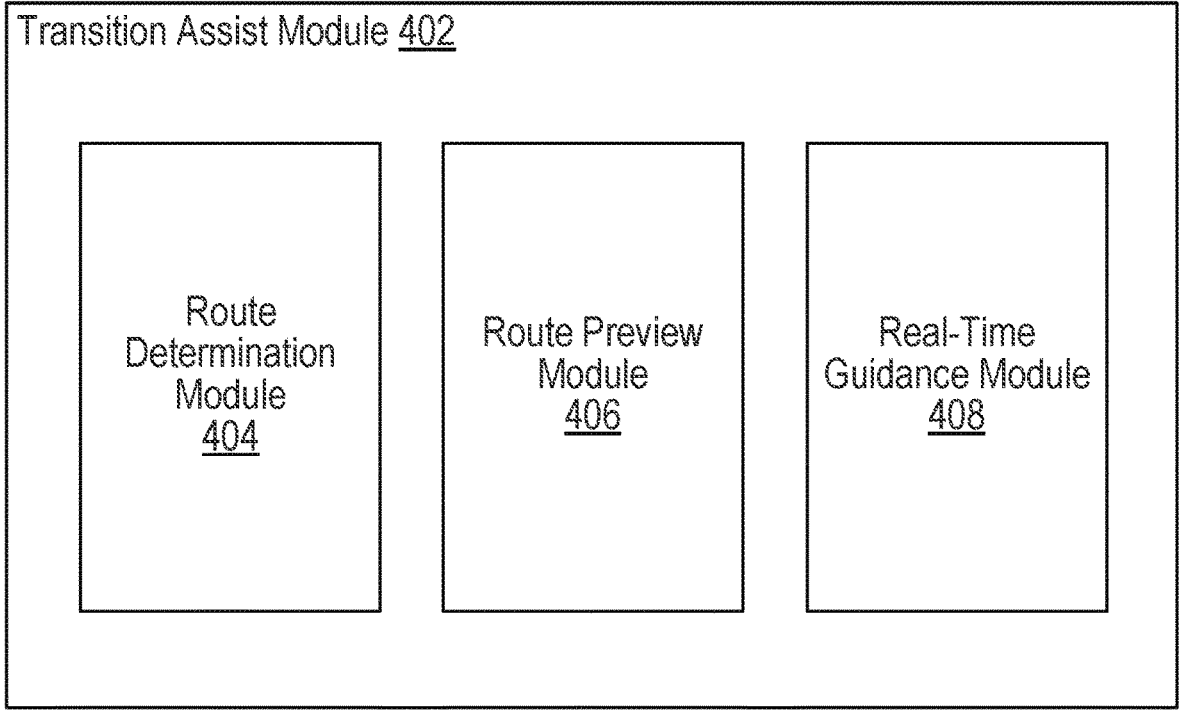
FIG. 4 illustrates an example transition assist module, according to an embodiment of the present technology.

FIG. 4 illustrates an example transition assist module 402, according to an embodiment of the present technology. In some embodiments, the transition assist module 308 of FIG. 3 can be implemented as the transition assist module 402. The transition assist module 402 can be configured to determine a route for a traveler to travel from a starting location to a destination location and provide navigation guidance for the route, which may include guidance on how to access various modes of transport along the route. As shown in the example of FIG. 4, the transition assist module 402 can include a route determination module 404, a route preview module 406, and a real-time guidance module 408.

The route determination module 404 can be configured to determine, based on starting location information defining a starting location and destination location information defining a destination location, route information defining a route from the starting location to the destination location. Based on map data (e.g., from the map data module 304) and/or transport data (e.g., from the transport data module 306), the route determination module 404 can determine a route from the starting location to the destination location. In some instances, the route determination module 404 may take into account the availability of various modes of transport (e.g., based on the traveler's location, departure and/or arrival time, user preferences, etc.). In certain embodiments, the route determination module 404 may determine a route that balances factors such as cost and duration of travel against factors such as risk and cost of missing a connection, possibility of delay or cancellation, complexity of navigation at transition points, etc. The route determination module 404 can utilize any available information to generate a highly detailed, step-by-step route to be taken by a traveler. For example, for a traveler traveling to an airport, the route determination module 404 can utilize road map information to determine a rideshare vehicle route from the traveler's home to the airport. Further to this example, the route determination module 404 can then utilize high-definition structural map data for the airport to identify rideshare pick-up/drop-off locations in the airport, directions to the appropriate elevator for the traveler to access a TSA pre-approved line, a path from the security area to a gate associated with a flight to be taken by the traveler (which can be determined based on traveler ticket information and/or airline schedule information), and the like. In other examples, the route determination module 404 may access structural map data for a train station (or a bus station) to determine a route that directs a user through a train station to his or her train, and then structural map data for the train to further determine a route that directs the user directly to the appropriate train car and then to his or her seat. Once a route is determined, the route determination module 404 may provide route information defining the determined route to other modules, including, for example, the route preview module 406, and/or the real-time guidance module 408.

In some embodiments, the route determination module 404 may adjust a previously-determined route based on dynamic transport data from the transport data module 306. For example, changes to traffic conditions and/or aircraft or train delays may cause the route determination module 404 to modify a previously-determined route. In some embodiments, the route determination module 404 may adjust a previously-determined route based on actions taken by a user or indicated preferences of a user. For example, if a user deviates from a previously-determined route or provides a command to a computing device indicating desired deviation, the route determination module 404 may update the previously-determined route and/or generate a new route based on user location information indicative of the user's current location.

The route preview module 406 can be configured to generate a preview of a route to be traveled by a traveler. The preview may be generated based on route information defining a route as determined by the route determination module 404. The preview can take various forms. For example, the preview may be a video preview. In a more particular example, the preview may be a video which presents a simulated walk-through of the route from a first-person perspective. The preview can demonstrate to the traveler what the traveler is likely to experience along the route. For example, in a first-person video preview, the preview may present the traveler's anticipated views (e.g., surrounding buildings, surrounding hallways or building interiors, entrances into and/or exits out of structures and/or vehicles, etc.) as the traveler traverses the route. In the case of a video preview, the traveler may fast-forward the preview or rewind the preview to focus on certain segments of the route. In another example, the preview may be presented as a 2-dimensional or 3-dimensional map view which depicts the route on a 2-dimensional or 3-dimensional map. Many variations are possible.

In an embodiment, the route preview module 406 can generate a preview based on route information defining a route (e.g., from the route determination module 404) and map data (e.g., from the map data module 304). As discussed, the map data module 304 can access and/or provide semantic maps, HD maps, indoor maps, venue maps, ingress/egress maps, building footprints, and the like. Further, map data may be combined such that multiple types of map data can be layered together. Using this map data, the route preview module 406 can generate a 2-dimensional and/or 3-dimensional representation of a determined route. The 2-dimensional and/or 3-dimensional representation of a route can be used to automatically generate a video preview of the route. For example, a route may be defined by a plurality of points, with each point defining a particular geographic location (e.g., a latitude and a longitude). For each point of at least a subset of the plurality of points, map data may include data pertaining to one or more views from the geographic location associated with that point. For example, for each point/geographic location, map data may include one or more images captured from the geographic location, with each image defining a view from the geographic location in a particular direction. In an embodiment, the one or more images can collectively define a 360-degree view from the geographic location. Or in another example, for each point/geographic location, map data can include three-dimensional point cloud data (e.g., generated using lidar data captured by a lidar system) and/or image data (e.g., captured using a camera) captured from the geographic location. The three-dimensional point cloud data and/or the image data may be used to generate a three-dimensional representation of the environment as can be observed from the particular geographic location. The route preview module 406 can stitch together views for each point in the plurality of points that define a route (or a subset of the plurality of points) in order to generate a video preview that previews for a user what the user will see as the user traverses the route.

The route preview module 406 may utilize 3-dimensional landmark meshes, texturization, voxels and/or point clouds, or other mapping and graphic rendering techniques to provide photo-realistic or high-definition 3D graphical views along a route. In some embodiments, the preview can be pre-rendered and maintained (e.g., cached) on a computing device and/or can be generated on-demand by the computing device. In certain embodiments, the preview may be rendered on a remote server or a cloud and downloaded onto the computing device. The preview may be presented, for example, on one or more displays mounted on a vehicle, a mobile device, or any other device or structure incorporating a display. In some embodiments, previews may be altered or customized based on form factors or display capacity (e.g., resolution, display size, display location, display brightness and contrast, etc.) of the displays. In some embodiments, the previews may include renderings of virtual vehicles and/or modes of transport, such as a virtual train or a virtual bus, and show a simulation of how to make a transition to a mode of transport (e.g., which train platform to approach, and which door on the train to enter). The previews can reflect various view perspectives. For example, the preview may be a first-person preview that reflects the perspective of the user as the user traverses a route, or may be a third-person preview that shows an avatar of the user traversing the route, or a birds-eye view that shows a preview of the route from above. Many variations are possible.

The real-time guidance module 408 can be configured to provide navigation guidance indicators that direct a traveler as the traveler traverses a route. The navigation guidance indicators can include visual, auditory, and/or tactile cues. Some cues can be related to directions, and may be provided in the form of arrows, text (e.g., "turn right," "scooter rack behind the building," etc.), or symbols (goal line, goal post, flags, etc.). The navigation guidance indicators can be overlaid, transposed, or otherwise provided to the traveler over rendered environments (e.g., 2-dimensional or 3-dimensional simulated environments) and/or over image data being captured by a camera and presented in a camera interface. For example, navigation guidance indicators can be applied as an augmented reality overlay presented through a camera interface to provide a user with AR navigation instructions applied to objects detected within the user's immediate environment.

Navigation guidance indicators can help a traveler precisely navigate an intended route. For example, navigation guidance indicators can identify exactly where a reserved bicycle or scooter is, exactly which train to take and which train door to enter, which elevator or escalator to take and how many floors up or down to take it, and the like. As another example, visual navigation guidance indicators can, as a passenger-traveler of a rideshare service nears an airport, highlight a particular entrance to the airport, show a path from the entrance to an escalator to get to check-in, show a path from check-in to security, from security to the gate, and from the gate to the traveler's assigned seat, and the like. In some embodiments, the navigation guidance indicators may highlight, mark, provide a marquee, or otherwise emphasize objects and points of interest. Visual navigation guidance indicators in augmented reality can be especially advantageous because the navigation guidance indicators can provide guidance even when waypoints are not visible to unaided eyes of a traveler. For example, the visual navigation guidance indicators can provide guidance on how to find a bicycle or scooter rack when the rack is behind a building that obstructs the traveler's view. As another example, the visual navigation guidance indicators can provide guidance through an elevator shaft, visually showing how far a traveler needs to go up or down to get to a floor of interest.

Visual navigation guidance indicators can be provided on any display, including displays mounted on a mode of transport (e.g., a vehicle) and/or a display on a mobile device associated with a traveler. If a user is riding in a ride-share vehicle, the windows of the vehicle can be used as displays on which navigation guidance indicators can be placed. For example, if a user is taking a vehicle to an airport, and the airport is visible through a window, a navigation guidance indicator can be displayed on the window highlighting the airport. Similarly, a camera interface on a mobile device carried by the same user can be used to provide a navigation guidance indicator that highlights the airport within the camera interface. In certain embodiments, if a primary visual indicator is out of view of a particular display, the particular display can display a secondary indicator that directs the user to the primary visual indicator. For example, consider an example scenario in which a user's route is leading them to an airport. As the user rides a vehicle to the airport, the airport may be visible from the front window of the vehicle, but may not be visible from the side windows of the vehicle. The front window of the vehicle can display a primary indicator which highlights the approaching airport, while the side windows of the vehicle may include secondary indicators which direct the user's view towards the front window so that the user can see the primary indicator. Or in another example, if that same user is using his or her mobile device and navigation guidance indicators are overlaid on image data depicted in a camera interface displayed on the mobile device, the user may have his or her camera pointing toward a right-side window of the vehicle. In such a scenario, the camera interface may display a leftward arrow that indicates to the user that the user should shift the view of the camera to the left in order to see the approaching airport. If the user turns his or her camera to the left such that the airport comes into view in the camera interface, the camera interface can then display a primary indicator which highlights the approaching airport.

In some embodiments, the real-time guidance module 408 can access sensor data associated with a user, such as a traveler. Sensor data may be provided by one or more sensors. Sensor data can be provided by, for example, a gyroscope(s), a global positioning system (GPS), compass, accelerometer(s), inertial measurement unit(s), a camera, a lidar system, a radar system, a microphone, Wi-Fi-related sensors, Bluetooth-related sensors, or other sensors. In various embodiments, these sensors may be provided by a computing device associated with the traveler (e.g., a mobile device being carried by the traveler), and/or provided by a vehicle in which the traveler is riding. In an embodiment, the real-time guidance module 408 can access sensor data associated with a user and analyze the sensor data to determine a position of the user relative to one or more objects within his or her environment. The one or more objects may be known objects that are represented in map data. The real-time guidance module 408 can then generate one or more indicators based on the position of the traveler relative to the one or more known objects represented in map data. For example, sensor data (e.g., GPS data) and map data can be used to determine that the user is directly to the east of a train station that is the next stop on the user's route. In this example, sensor data (e.g., compass data) can also be used to determine that the user has his or her mobile device pointed to the west. Further, sensor data (e.g., image data) captured by a camera on the user's mobile device can be analyzed to determine that the train station is depicted in a camera interface displayed on the mobile device, and a navigation guidance indicator can be generated and applied to the camera interface which highlights the train station. Various other types of sensors and related positioning techniques can also be used to provide position data indicative of the user's position within his or her environment. For example, Bluetooth beacons, Wi-Fi fingerprinting, cell-tower triangulation, and the like can be utilized to identify the position and/or location of a user. When some of the sensors provide less than satisfactory positioning data or no data at all, such as a GPS sensor when indoors or in a tunnel, one or more of the other sensors can supplement or provide positioning data. For example, if a user is inside a physical structure, where a reliable GPS signal is not available, Bluetooth beacons, Wi-Fi fingerprinting, image analysis of the user's immediate area, or other localization methods can be used to determine the position of the user within the physical structure.

In various embodiments, sensor data can include image data captured by a camera (e.g., captured by a camera on a user's mobile device, or captured by a camera mounted to a vehicle in which the user is riding). By comparing features in image data with features for known objects (e.g., edges, features, points of interest) in the scene and in map data, and aligning features in the image data with features present in map data, the real-time guidance module 408 can determine a position of the user within map data (e.g., relative to one or more known objects represented in map data). For example, a camera on a user's mobile device or a camera on a vehicle on which the user is riding can capture image data. Object detection/recognition can be performed on the captured image data to identify one or more objects depicted in the image data. The one or more objects can be matched with known objects in map data in order to determine a position of the user with respect to the one or more known objects. Generally known imaging techniques (e.g., edge detection, structure from motion, scale-invariant feature transform (SIFT), etc.) can be used to detect and/or recognize features and/or objects in image data. For example, a machine learning model can be used to recognize objects and/or features depicted in image data. Some of the objects of interest may be modes of transport, such as a train, a bicycle or an electric scooter, or a rideshare service vehicle. Some of the objects of interest may be structural objects, such as buildings, elevators, escalators, points of ingress or egress, and the like.

Sensor data can include lidar data captured by a lidar system. The lidar system may be mounted on a vehicle and one or more point clouds can be generated based on lidar data collected from the lidar system while the vehicle travels. The one or more point clouds can include a collection of data points in space that provide a 3-dimensional representation of an environment and objects within the environment with their relative positions to the vehicle. The representations can be compared with known layouts of the environment or the positions of the objects corresponding to the representations in map data and, through alignment of the positions of the representations with the known positions, the real-time guidance module 408 can determine a position of the vehicle (and, therefore, a position of a user riding the vehicle) relative to various known objects represented in map data.

Once the position of a user is determined, the real-time guidance module 408 can generate navigation guidance indicators that help navigate the user along a route determined by the route determination module 404 based on the position of the user relative to known objects. For example, if a user has his or her mobile device pointed north, and it is known that the user's train is proximate the user and is north of the user, image data captured by a camera on the user's mobile device can be analyzed to identify the train within the image data, and a navigation guidance indicator which highlights the train can be presented on the user's mobile device.

Figure 5A:
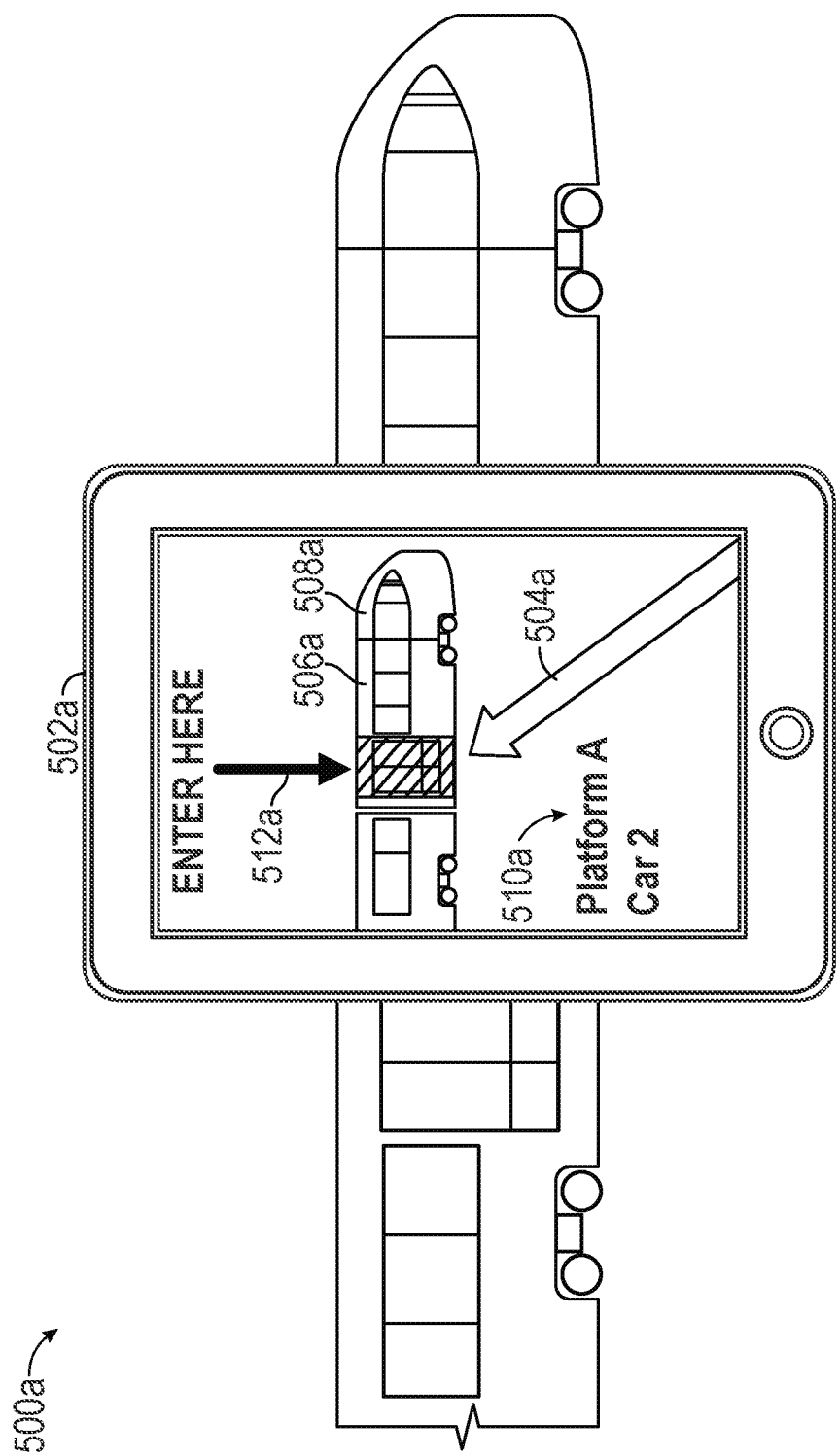
FIGS. 5A-5C illustrate example scenarios, according to various embodiments of the present technology.
Figure 5B:
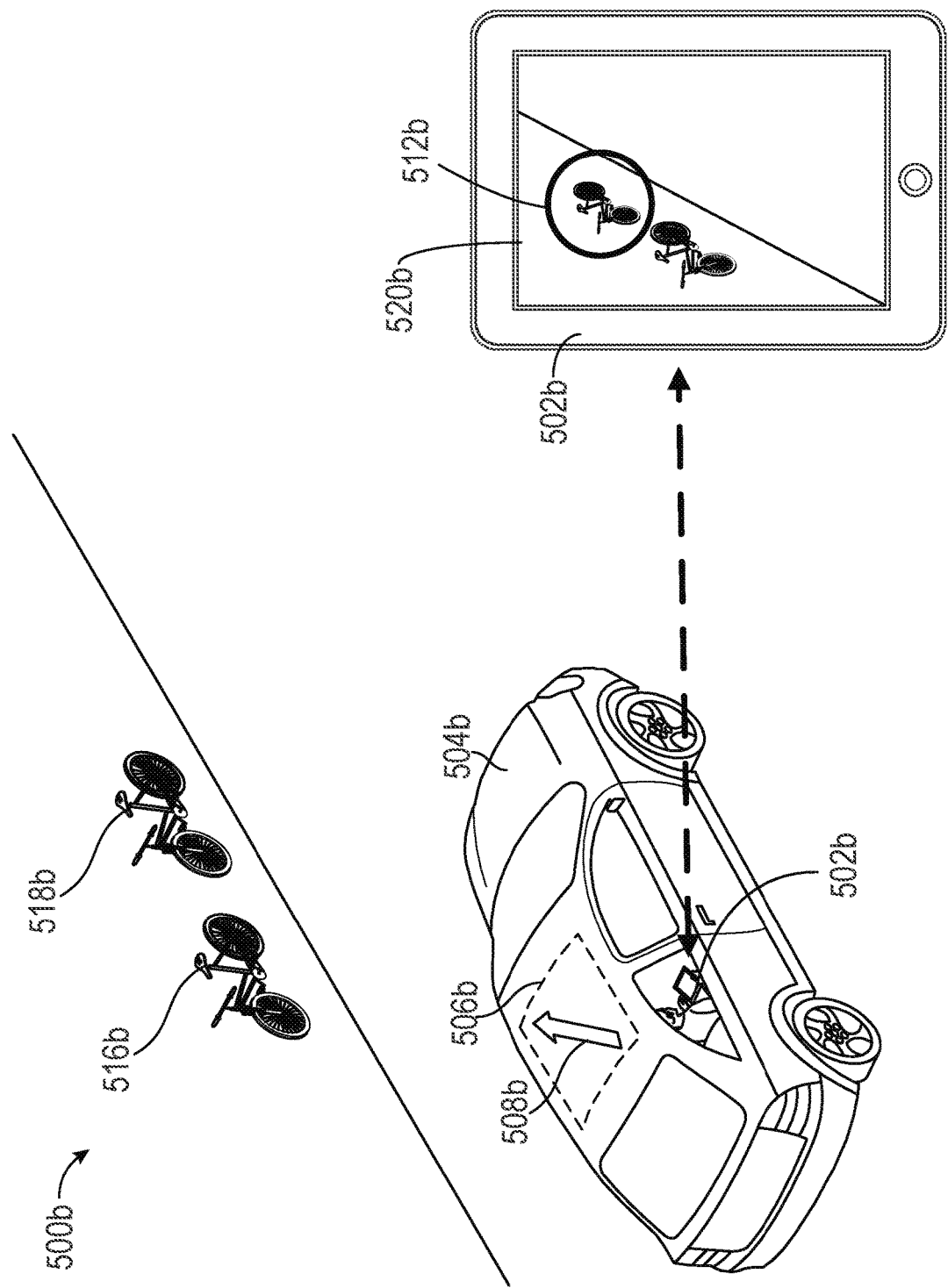
Figure 5C:
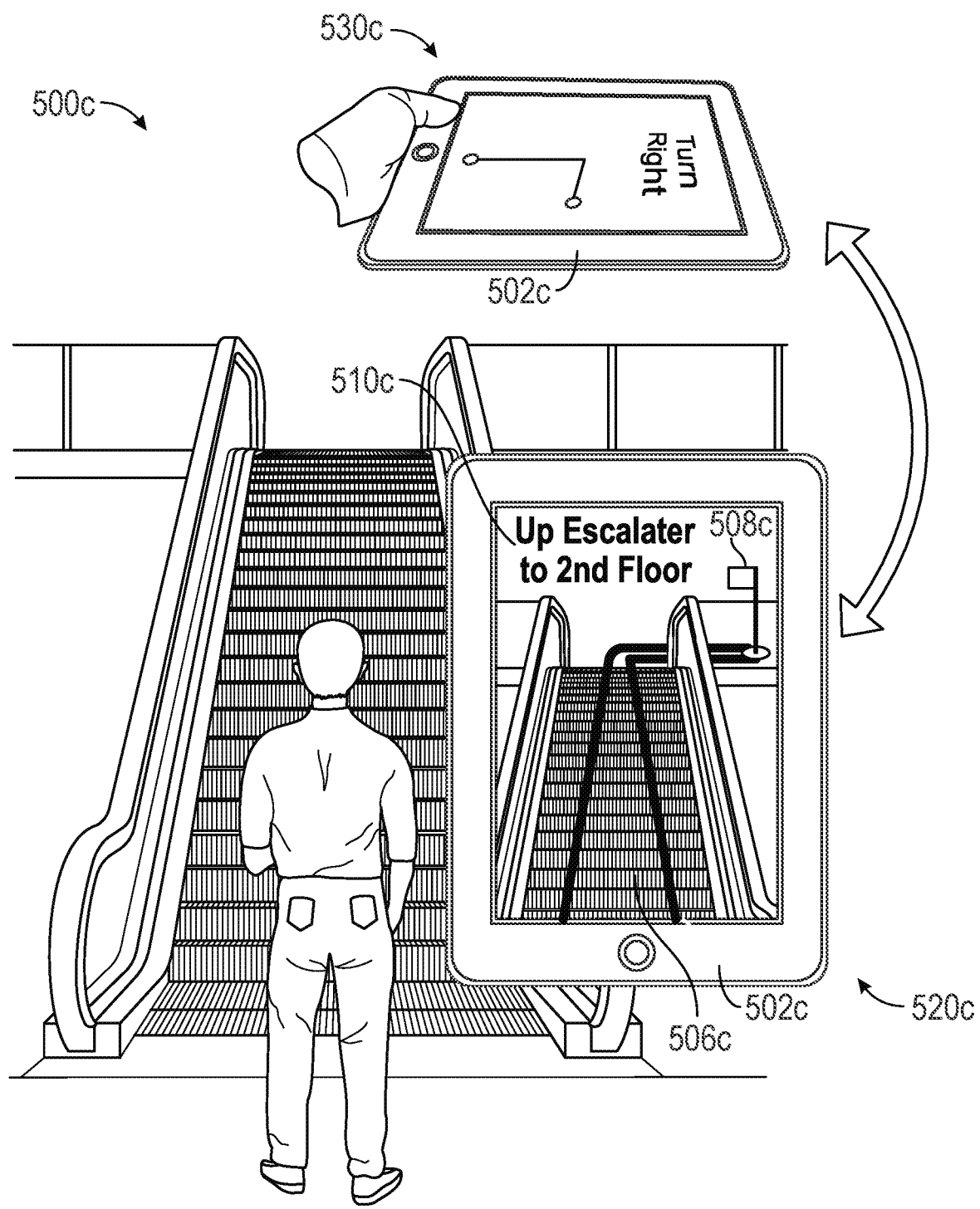

FIGS. 5A-5C illustrate various example scenarios supported by the travel assist module 302, according to various embodiments of the present technology. FIG. 5A illustrates an example scenario 500a relating to a traveler seeking to board a train. The traveler can use a camera on a mobile device 502a to capture his or her environment, which is displayed on a camera interface of the mobile device 502a. Image data depicted in the camera interface can be overlaid with various augmented reality navigation guidance indicators. For example, a navigation guidance indicator 504a (e.g., an arrow) shows a path of travel to get to the correct train. If the user uses the mobile device 502a to point the camera at a different train (not shown), the user may be presented through the camera interface with a navigation guidance indicator indicating that the different train is not the train to be taken by the user. In some embodiments, a textual navigation guidance indicator 510a ("PLATFORM A Car 2") may be provided through the camera interface, indicating that the train stationed at Platform A is the correct train to be taken by the user and that the user should enter Car 2 of the train. The camera interface shown in FIG. 5A depicts multiple cars 506a, 508a of the train. The camera interface highlights the correct car door the user should enter via a navigation guidance indicator 512a.

FIG. 5B depicts an example scenario 500b in which the user must transition from a vehicle 504b (e.g., autonomous vehicle) to another mode of transport (e.g., a bicycle, an electric scooter, etc.). In the example scenario 500b, the user is transitioning from the vehicle 504b to one of two bicycles 516b, 518b. FIG. 5B illustrates two separate displays providing a user with navigation guidance. One display 506b is mounted on a roof of the vehicle 504b. A second display 520b is on a mobile device 502b being held by the user. The displays 520b, 506b can work independently and/or in tandem to provide navigation guidance to guide the user in their travel. In the example scenario 500b, the display 506b includes an arrow indicator 508b which directs the user in the direction of the bicycles 516b, 518b. In response to seeing the arrow indicator 508b, the user can point a camera on his or her mobile device 502b in the direction of the bicycles 516b, 518b. A camera interface on the mobile device 502b displays the two bicycles 516b, 518b. The camera interface also includes a navigation guidance indicator 512b which identifies the particular bicycle that has been assigned to the user so that the user knows which bicycle to ride. In certain embodiments, windows of the vehicle 504b can act as displays such that augmented reality navigation guidance indicators can be displayed on the windows. For example, in the example scenario 500b, a user sitting in the vehicle 504b may be able to see the bicycles 516b, 518b through the left-side windows of the vehicle 504b. Augmented reality navigation guidance indicators can be displayed on the left-side windows in a manner similar to that shown on the display 520b such that a bicycle that is assigned to the user is highlighted for the user. In some embodiments, the other windows (e.g., front window, rear window, right-side windows) can include secondary indicators which direct the user to look towards the left-side windows, similar to the arrow indicator 508b depicted on the display 506b. As depicted in the example scenario 500b, different displays, such as the displays 520b, 506b, may provide different sets and/or types of information. For example, as shown, the mobile device display 520b may provide a navigation guidance indicator 512b for the bicycle that has been assigned to the user, while the roof display 506b may display a different navigation guidance indicator that points in the direction of the bicycles 516b, 518b. Many variations are possible.

FIG. 5C illustrates an example scenario 500c in which a traveler can use a mobile device 502c to receive navigation guidance. The traveler can hold up the mobile device 502c in order to capture image data using a camera on the mobile device 502c. The image data is presented on a camera interface on the mobile device 502c. A position of the user can be determined based on the image data captured by the camera as well as other sensor data, and one or more objects depicted in the image data can be identified. Based on the position of the user and the one or more objects identified in the image data, one more navigation guidance indicators can be applied to image data depicted in the camera interface to guide the user along a route. For example, the navigation guidance indicators can include textual navigation information 510c (directing the user to go up the escalator to the $2^{nd}$ floor), a path 506c showing the traveler which way to proceed, and/or a destination marker 508c.

In some embodiments, a traveler may toggle between different presentation formats for presentation of navigation guidance. For example, a user can orient a mobile device in a first orientation to display navigation guidance in a first presentation format, and can orient a mobile device in a second orientation to display navigation guidance in a second presentation format. In the example scenario 500c, holding the mobile device 502c vertically (e.g., substantially perpendicular to the ground) in a first orientation 520c provides the traveler with an augmented reality view providing real-time navigation guidance, while holding the mobile device 502c horizontally (e.g., substantially parallel to the ground) in a second orientation 530c provides the traveler with a bird's eye map view of the route to be taken.

Figure 6:
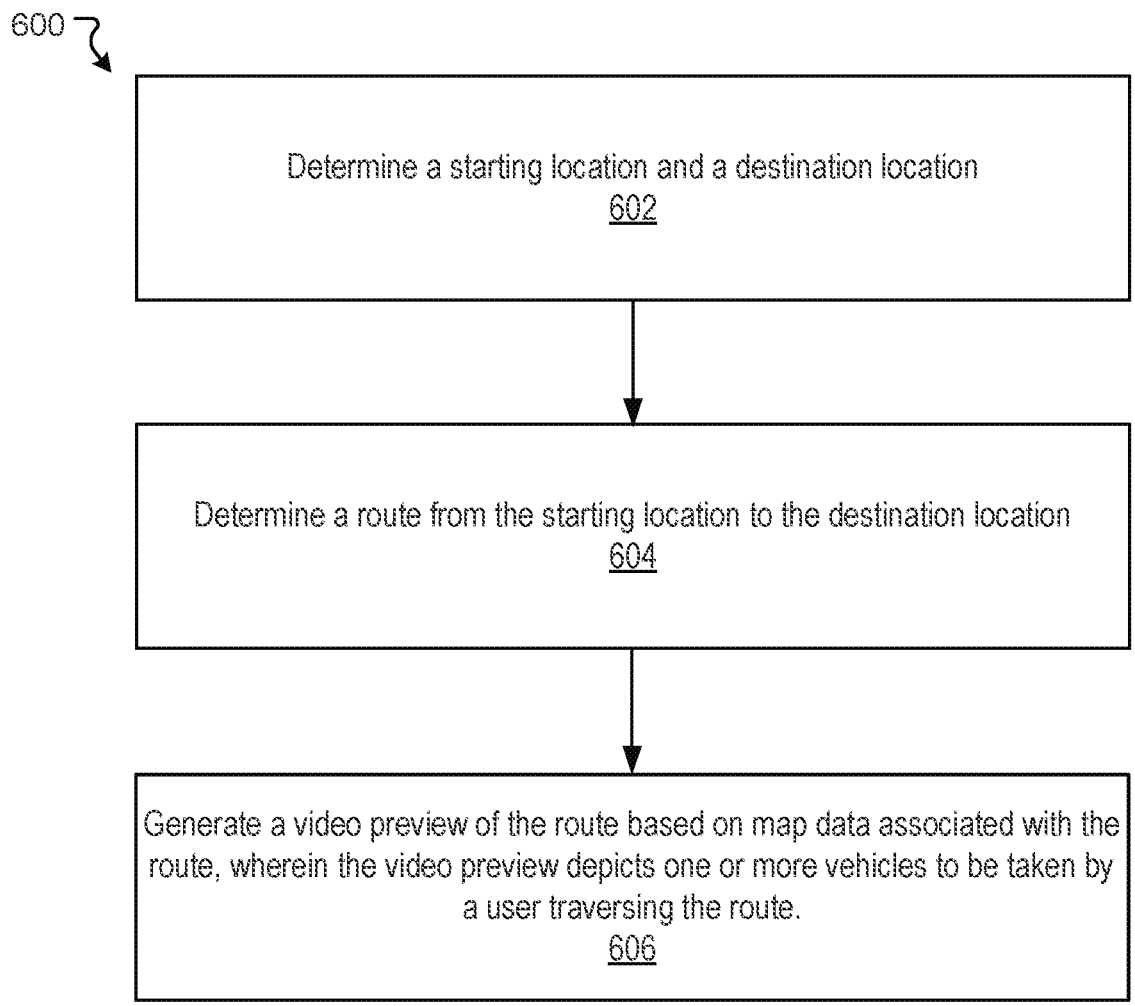
FIG. 6 illustrates an example method, according to an embodiment of the present technology.

FIG. 6 illustrates an example method 600, according to an embodiment of the present technology. At block 602, the example method 600 can receive a starting location and a destination location. At block 604, the example method 600 can determine a route from the starting location to the destination location. At block 606, the example method 600 can generate a video preview of the route based on map data associated with the route, wherein the video preview depicts one or more vehicles to be taken by a user traversing the route.

Many variations to the example method are possible. It should be appreciated that there can be additional, fewer, or alternative steps performed in similar or alternative orders, or in parallel, within the scope of the various embodiments discussed herein unless otherwise stated.

Figure 7:
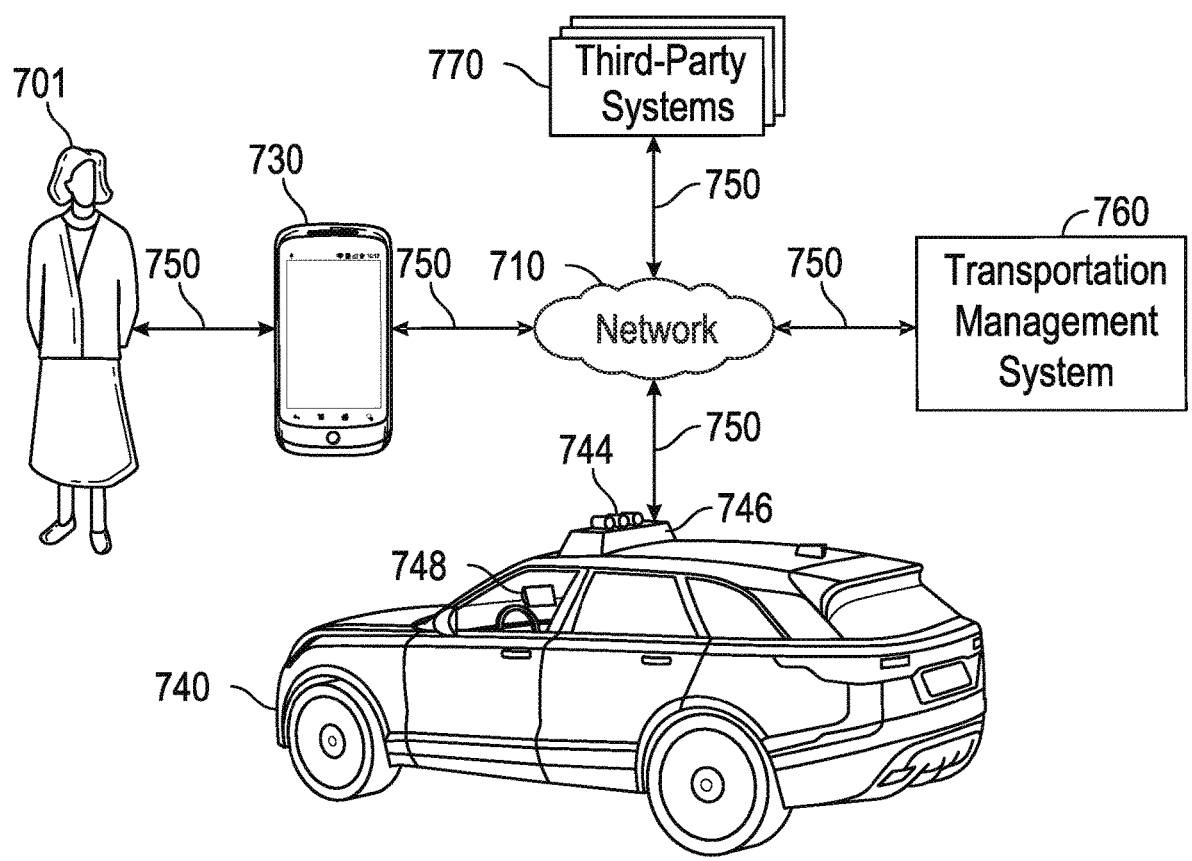
FIG. 7 illustrates an example block diagram of a transportation management environment, according to an embodiment of the present technology.

FIG. 7 illustrates an example block diagram of a transportation management environment for matching ride requestors with vehicles. In particular embodiments, the environment may include various computing entities, such as a user computing device 730 of a user 701 (e.g., a ride provider or requestor), a transportation management system 760, a vehicle 740, and one or more third-party systems 770. The vehicle 740 can be autonomous, semi-autonomous, or manually drivable. The computing entities may be communicatively connected over any suitable network 710. As an example and not by way of limitation, one or more portions of network 710 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 7 illustrates a single user device 730, a single transportation management system 760, a single vehicle 740, a plurality of third-party systems 770, and a single network 710, this disclosure contemplates any suitable number of each of these entities. As an example and not by way of limitation, the network environment may include multiple users 701, user devices 730, transportation management systems 760, vehicles 740, third-party systems 770, and networks 710. In some embodiments, some or all modules of the travel assist module 302 may be implemented by one or more computing systems of the transportation management system 760. In some embodiments, some or all modules of the travel assist module 302 may be implemented by one or more computing systems in the vehicle 740.

The user device 730, transportation management system 760, vehicle 740, and third-party system 770 may be communicatively connected or co-located with each other in whole or in part. These computing entities may communicate via different transmission technologies and network types. For example, the user device 730 and the vehicle 740 may communicate with each other via a cable or short-range wireless communication (e.g., Bluetooth, NFC, WI-FI, etc.), and together they may be connected to the Internet via a cellular network that is accessible to either one of the devices (e.g., the user device 730 may be a smartphone with LTE connection). The transportation management system 760 and third-party system 770, on the other hand, may be connected to the Internet via their respective LAN/WLAN networks and Internet Service Providers (ISP). FIG. 7 illustrates transmission links 750 that connect user device 730, vehicle 740, transportation management system 760, and third-party system 770 to communication network 710. This disclosure contemplates any suitable transmission links 750, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 750 may connect to one or more networks 710, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 750. For example, the user device 730 may communicate with the transportation management system via a cellular network and the Internet, but communicate with the vehicle 740 via Bluetooth or a physical wire connection.

In particular embodiments, the transportation management system 760 may fulfill ride requests for one or more users 701 by dispatching suitable vehicles. The transportation management system 760 may receive any number of ride requests from any number of ride requestors 701. In particular embodiments, a ride request from a ride requestor 701 may include an identifier that identifies the ride requestor in the system 760. The transportation management system 760 may use the identifier to access and store the ride requestor's 701 information, in accordance with the requestor's 701 privacy settings. The ride requestor's 701 information may be stored in one or more data stores (e.g., a relational database system) associated with and accessible to the transportation management system 760. In particular embodiments, ride requestor information may include profile information about a particular ride requestor 701. In particular embodiments, the ride requestor 701 may be associated with one or more categories or types, through which the ride requestor 701 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 760 may classify a user 701 based on known information about the user 701 (e.g., using machine-learning classifiers), and use the classification to retrieve relevant aggregate information associated with that class. For example, the system 760 may classify a user 701 as a young adult and retrieve relevant aggregate information associated with young adults, such as the type of music generally preferred by young adults.

Transportation management system 760 may also store and access ride information. Ride information may include locations related to the ride, traffic data, route options, optimal pick-up or drop-off locations for the ride, or any other suitable information associated with a ride. As an example and not by way of limitation, when the transportation management system 760 receives a request to travel from San Francisco International Airport (SFO) to Palo Alto, California, the system 760 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 760. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 760. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 760 in particular embodiments may predict and provide ride suggestions in response to a ride request. In particular embodiments, the system 760 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 760 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 760 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 730 (which may belong to a ride requestor or provider), a transportation management system 760, vehicle system 740, or a third-party system 770 to process, transform, manage, retrieve, modify, add, or delete the information stored in the data store.

In particular embodiments, transportation management system 760 may include an authorization server (or any other suitable component(s)) that allows users 701 to opt-in to or opt-out of having their information and actions logged, recorded, or sensed by transportation management system 760 or shared with other systems (e.g., third-party systems 770). In particular embodiments, a user 701 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 701 of transportation management system 760 through blocking, data hashing, anonymization, or other suitable techniques as appropriate.

In particular embodiments, third-party system 770 may be a network-addressable computing system that may provide HD maps or host GPS maps, customer reviews, music or content, weather information, or any other suitable type of information. Third-party system 770 may generate, store, receive, and send relevant data, such as, for example, map data, customer review data from a customer review website, weather data, or any other suitable type of data. Third-party system 770 may be accessed by the other computing entities of the network environment either directly or via network 710. For example, user device 730 may access the third-party system 770 via network 710, or via transportation management system 760. In the latter case, if credentials are required to access the third-party system 770, the user 701 may provide such information to the transportation management system 760, which may serve as a proxy for accessing content from the third-party system 770.

In particular embodiments, user device 730 may be a mobile computing device such as a smartphone, tablet computer, or laptop computer. User device 730 may include one or more processors (e.g., CPU, GPU), memory, and storage. An operating system and applications may be installed on the user device 730, such as, e.g., a transportation application associated with the transportation management system 760, applications associated with third-party systems 770, and applications associated with the operating system. User device 730 may include functionality for determining its location, direction, or orientation, based on integrated sensors such as GPS, compass, gyroscope, or accelerometer. User device 730 may also include wireless transceivers for wireless communication and may support wireless communication protocols such as Bluetooth, near-field communication (NFC), infrared (IR) communication, WI-FI, and 2G/3G/4G/LTE mobile communication standard. User device 730 may also include one or more cameras, scanners, touchscreens, microphones, speakers, and any other suitable input-output devices.

In particular embodiments, the vehicle 740 may be equipped with an array of sensors 744, a navigation system 746, and a ride-service computing device 748. In particular embodiments, a fleet of vehicles 740 may be managed by the transportation management system 760. The fleet of vehicles 740, in whole or in part, may be owned by the entity associated with the transportation management system 760, or they may be owned by a third-party entity relative to the transportation management system 760. In either case, the transportation management system 760 may control the operations of the vehicles 740, including, e.g., dispatching select vehicles 740 to fulfill ride requests, instructing the vehicles 740 to perform select operations (e.g., head to a service center or charging/fueling station, pull over, stop immediately, self-diagnose, lock/unlock compartments, change music station, change temperature, and any other suitable operations), and instructing the vehicles 740 to enter select operation modes (e.g., operate normally, drive at a reduced speed, drive under the command of human operators, and any other suitable operational modes).

In particular embodiments, the vehicles 740 may receive data from and transmit data to the transportation management system 760 and the third-party system 770. Examples of received data may include, e.g., instructions, new software or software updates, maps, 3-dimensional models, trained or untrained machine-learning models, location information (e.g., location of the ride requestor, the vehicle 740 itself, other vehicles 740, and target destinations such as service centers), navigation information, traffic information, weather information, entertainment content (e.g., music, video, and news) ride requestor information, ride information, and any other suitable information. Examples of data transmitted from the vehicle 740 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 740, passengers may send/receive data to the transportation management system 760 and third-party system 770), and any other suitable data.

In particular embodiments, vehicles 740 may also communicate with each other, including those managed and not managed by the transportation management system 760. For example, one vehicle 740 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 760 or third-party system 770), or both.

In particular embodiments, a vehicle 740 may obtain and process sensor/telemetry data. Such data may be captured by any suitable sensors. For example, the vehicle 740 may have a Light Detection and Ranging (LiDAR) sensor array of multiple LiDAR transceivers that are configured to rotate 360°, emitting pulsed laser light and measuring the reflected light from objects surrounding vehicle 740. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3-dimensional) model of the external environment of the vehicle 740. As an example and not by way of limitation, the 3-dimensional model may represent the external environment including objects such as other cars, curbs, debris, objects, and pedestrians up to a maximum range of the sensor arrangement (e.g., 50, 100, or 200 meters). As another example, the vehicle 740 may have optical cameras pointing in different directions. The cameras may be used for, e.g., recognizing roads, lane markings, street signs, traffic lights, police, other vehicles, and any other visible objects of interest. To enable the vehicle 740 to "see" at night, infrared cameras may be installed. In particular embodiments, the vehicle may be equipped with stereo vision for, e.g., spotting hazards such as pedestrians or tree branches on the road. As another example, the vehicle 740 may have radars for, e.g., detecting other vehicles and hazards afar. Furthermore, the vehicle 740 may have ultrasound equipment for, e.g., parking and obstacle detection. In addition to sensors enabling the vehicle 740 to detect, measure, and understand the external world around it, the vehicle 740 may further be equipped with sensors for detecting and self-diagnosing the vehicle's own state and condition. For example, the vehicle 740 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 740 may build a 3-dimensional model of its surrounding based on data from its LiDAR, radar, sonar, and cameras, along with a pre-generated map obtained from the transportation management system 760 or the third-party system 770. Although sensors 744 appear in a particular location on the vehicle 740 in FIG. 7, sensors 744 may be located in any suitable location in or on the vehicle 740. Example locations for sensors include the front and rear bumpers, the doors, the front windshield, on the side panel, or any other suitable location.

In particular embodiments, the vehicle 740 may be equipped with a processing unit (e.g., one or more CPUs and GPUs), memory, and storage. The vehicle 740 may thus be equipped to perform a variety of computational and processing tasks, including processing the sensor data, extracting useful information, and operating accordingly. For example, based on images captured by its cameras and a machine-vision model, the vehicle 740 may identify particular types of objects captured by the images, such as pedestrians, other vehicles, lanes, curbs, and any other objects of interest.

In particular embodiments, the vehicle 740 may have a navigation system 746 responsible for safely navigating the vehicle 740. In particular embodiments, the navigation system 746 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 746 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 746 may use its determinations to control the vehicle 740 to operate in prescribed manners and to guide the vehicle 740 to its destinations without colliding into other objects. Although the physical embodiment of the navigation system 746 (e.g., the processing unit) appears in a particular location on the vehicle 740 in FIG. 7, navigation system 746 may be located in any suitable location in or on the vehicle 740. Example locations for navigation system 746 include inside the cabin or passenger compartment of the vehicle 740, near the engine/battery, near the front seats, rear seats, or in any other suitable location.

In particular embodiments, the vehicle 740 may be equipped with a ride-service computing device 748, which may be a tablet or any other suitable device installed by transportation management system 760 to allow the user to interact with the vehicle 740, transportation management system 760, other users 701, or third-party systems 770. In particular embodiments, installation of ride-service computing device 748 may be accomplished by placing the ride-service computing device 748 inside the vehicle 740, and configuring it to communicate with the vehicle 740 via a wired or wireless connection (e.g., via Bluetooth). Although FIG. 7 illustrates a single ride-service computing device 748 at a particular location in the vehicle 740, the vehicle 740 may include several ride-service computing devices 748 in several different locations within the vehicle. As an example and not by way of limitation, the vehicle 740 may include four ride-service computing devices 748 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 748 may be detachable from any component of the vehicle 740. This may allow users to handle ride-service computing device 748 in a manner consistent with other tablet computing devices. As an example and not by way of limitation, a user may move ride-service computing device 748 to any location in the cabin or passenger compartment of the vehicle 740, may hold ride-service computing device 748, or handle ride-service computing device 748 in any other suitable manner. Although this disclosure describes providing a particular computing device in a particular manner, this disclosure contemplates providing any suitable computing device in any suitable manner.

Figure 8:
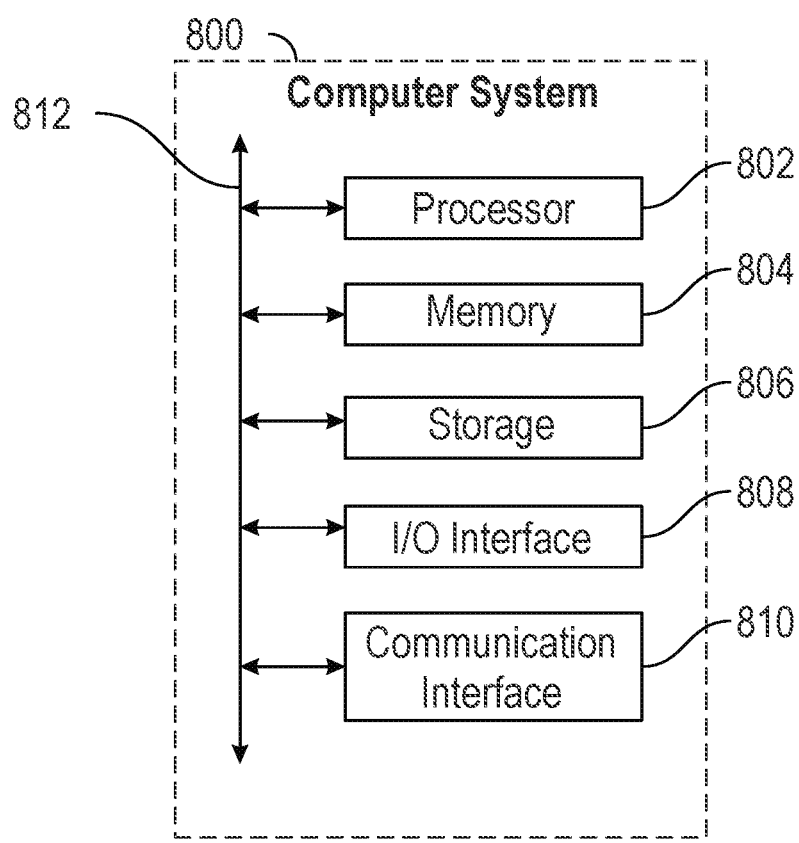
FIG. 8 illustrates an example of a computer system or computing device that can be utilized in various scenarios, according to an embodiment of the present technology.

FIG. 8 illustrates an example computer system 800. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 808; decode and execute them; and then write one or more results to an internal register, an internal cache, memory 804, or storage 808. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware or software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware or software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WN IC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware or software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   determining, by a computing system, a route from a starting location to a destination location, wherein the route comprises at least one transition point that involves a transition from a first mode of transport to a second mode of transport;
   generating, by the computing system, a preview associated with the at least one transition point, wherein the preview comprises navigation guidance instructions for transitioning a user from the first mode of transport to the second mode of transport at the at least one transition point;
   generating, by the computing system, a visual simulation of how to make a transition at the at least one transition point from a perspective of the user based on the navigation guidance instructions,
      wherein the visual simulation of the navigation guidance instructions provides one or more indicators that are overlaid on image data that represents one or more anticipated views of an environment that includes the at least one transition point,
      wherein the one or more indicators are provided based on a position of the user relative to an object,
      wherein the position is based on a global positioning system (GPS) or an inertial measurement unit (IMU); and
   providing, by the computing system, the preview to a computing device associated with the user.

2. The computer-implemented method of claim 1, further comprising:
   altering, by the computing system, the preview based on a form factor or display capacity of the computing device.

3. The computer-implemented method of claim 2, wherein the one or more indicators include a navigation guidance indicator that visually provides a path of travel to reach the second mode of transport or identifies the second mode of transport that has been assigned to the user.

4. The computer-implemented method of claim 2, wherein the one or more indicators include a navigation guidance indicator that provides textual instructions for transitioning from the first mode of transport to the second mode of transport at the at least one transition point.

5. The computer-implemented method of claim 1, wherein the preview includes renderings of the first mode of transport and the second mode of trans port.

6. The computer-implemented method of claim 1, wherein the first mode of transport is for traveling a first leg of the route, and wherein the second mode of transport is for traveling a second leg of the route.

7. The computer-implemented method of claim 1, wherein providing the preview to the computing device associated with the user further comprises:
providing, by the computing system, a generated video preview that provides a simulated walk-through of the navigation guidance instructions from a first-person perspective.

8. The computer-implemented method of claim 1, wherein providing the preview to the computing device associated with the user further comprises:
providing, by the computing system, an augmented reality interface in which the navigation guidance instructions are simulated with respect to objects detected in an environment external to the user.

9. The computer-implemented method of claim 1, wherein providing the preview to the computing device associated with the user further comprises:
providing, by the computing system, a first instruction associated with the navigation guidance instructions to a display screen associated with the first mode of transport; and
providing, by the computing system, a second instruction associated with the navigation guidance instructions to the computing device associated with the user.

10. The computer-implemented method of claim 1, further comprising:
determining, by the computing system, that the route includes a second transition point that involves a transition from the second mode of transport to a third mode of transport; and
generating, by the computing system, a second preview associated with the second transition point for transitioning from the second mode of transport to the third mode of transport at the second transition point.

11. A system comprising:
at least one processor; and
a memory storing instructions that, when executed by the at least one processor, cause the system to perform:
determining a route from a starting location to a destination location, wherein the route comprises at least one transition point that involves a transition from a first mode of transport to a second mode of transport;
generating a preview associated with the at least one transition point, wherein the preview comprises navigation guidance instructions for transitioning a user from the first mode of transport to the second mode of transport at the at least one transition point
generating a visual simulation of how to make a transition at the at least one transition point from a perspective of the user based on the navigation guidance instructions,
wherein the visual simulation of the navigation guidance instructions provides one or more indicators that are overlaid on image data that represents one or more anticipated views of an environment that includes the at least one transition point,
wherein the one or more indicators are provided based on a position of the user relative to an object,
wherein the position is based on a global positioning system (GPS) or an inertial measurement unit (IMU); and
providing the preview to a computing device associated with the user.

12. The system of claim 11, further comprising:
altering, by the computing system, the preview based on a form factor or display capacity of the computing device.

13. The system of claim 12, wherein the one or more indicators include a navigation guidance indicator that visually provides a path of travel to reach the second mode of transport or identifies the second mode of transport that has been assigned to the user.

14. The system of claim 12, wherein the one or more indicators include a navigation guidance indicator that provides textual instructions for transitioning from the first mode of transport to the second mode of transport at the at least one transition point.

15. The system of claim 11, wherein the preview includes renderings of the first mode of transport and the second mode of transport.

16. A non-transitory computer-readable storage medium including instructions that, when executed by at least one processor of a computing system, cause the computing system to perform a method comprising:
determining a route from a starting location to a destination location, wherein the route comprises at least one transition point that involves a transition from a first mode of transport to a second mode of transport;
generating a preview associated with the at least one transition point, wherein the preview comprises navigation guidance instructions for transitioning a user from the first mode of transport to the second mode of transport at the at least one transition point
generating a visual simulation of how to make a transition at the at least one transition point from a perspective of the user based on the navigation guidance instructions,
wherein the visual simulation of the navigation guidance instructions provides one or more indicators that are overlaid on image data that represents one or more anticipated views of an environment that includes the at least one transition point,
wherein the one or more indicators are provided based on a position of the user relative to an object,
wherein the position is based on a global positioning system (GPS) or an inertial measurement unit (IMU); and
providing the preview to a computing device associated with the user.

17. The non-transitory computer-readable storage medium of claim 16, further comprising:
altering, by the computing system, the preview based on a form factor or display capacity of the computing device.

18. The non-transitory computer-readable storage medium of claim 17, wherein the one or more indicators include a navigation guidance indicator that visually provides a path of travel to reach the second mode of transport or identifies the second mode of transport that has been assigned to the user.

19. The non-transitory computer-readable storage medium of claim 17, wherein the one or more indicators include a navigation guidance indicator that provides textual instructions for transitioning from the first mode of transport to the second mode of transport at the at least one transition point.

20. The non-transitory computer-readable storage medium of claim 16, wherein the preview includes renderings of the first preview mode of transport and the second mode of transport.

* * * * *